(No Model.) 2 Sheets—Sheet 1.
T. STREAT.
CIGAR MAKER'S IMPLEMENT.
No. 454,084. Patented June 16, 1891.
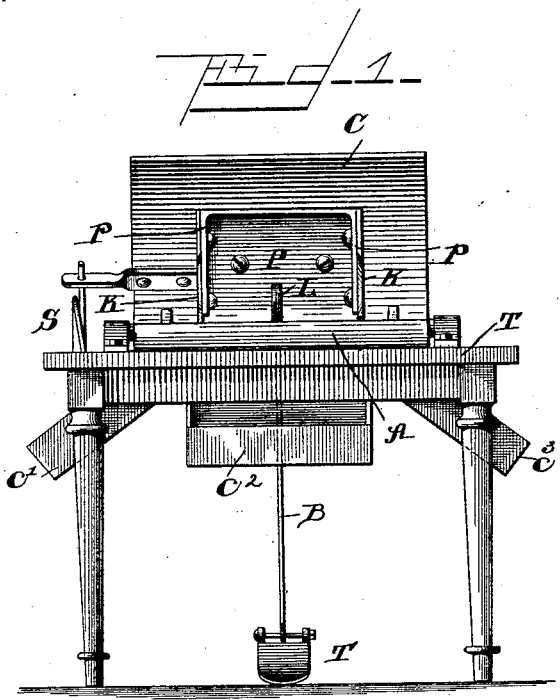
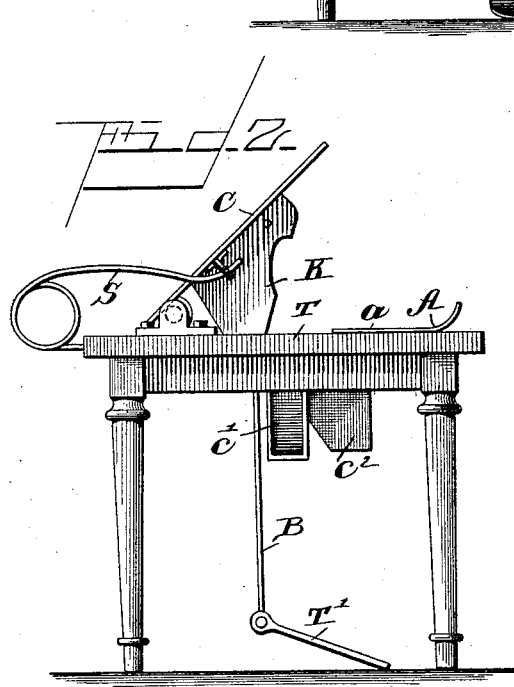
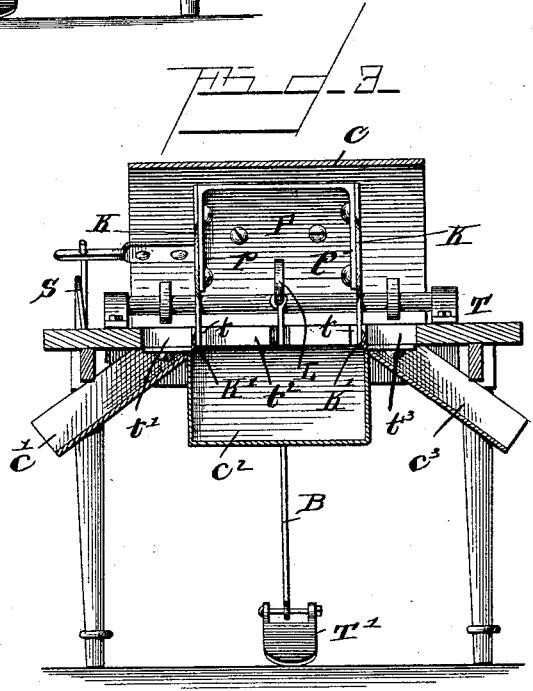
Witnesses:
H. G. Dieterich
P. W. Sommers
Inventor:
Thomas Streat
Attorney:

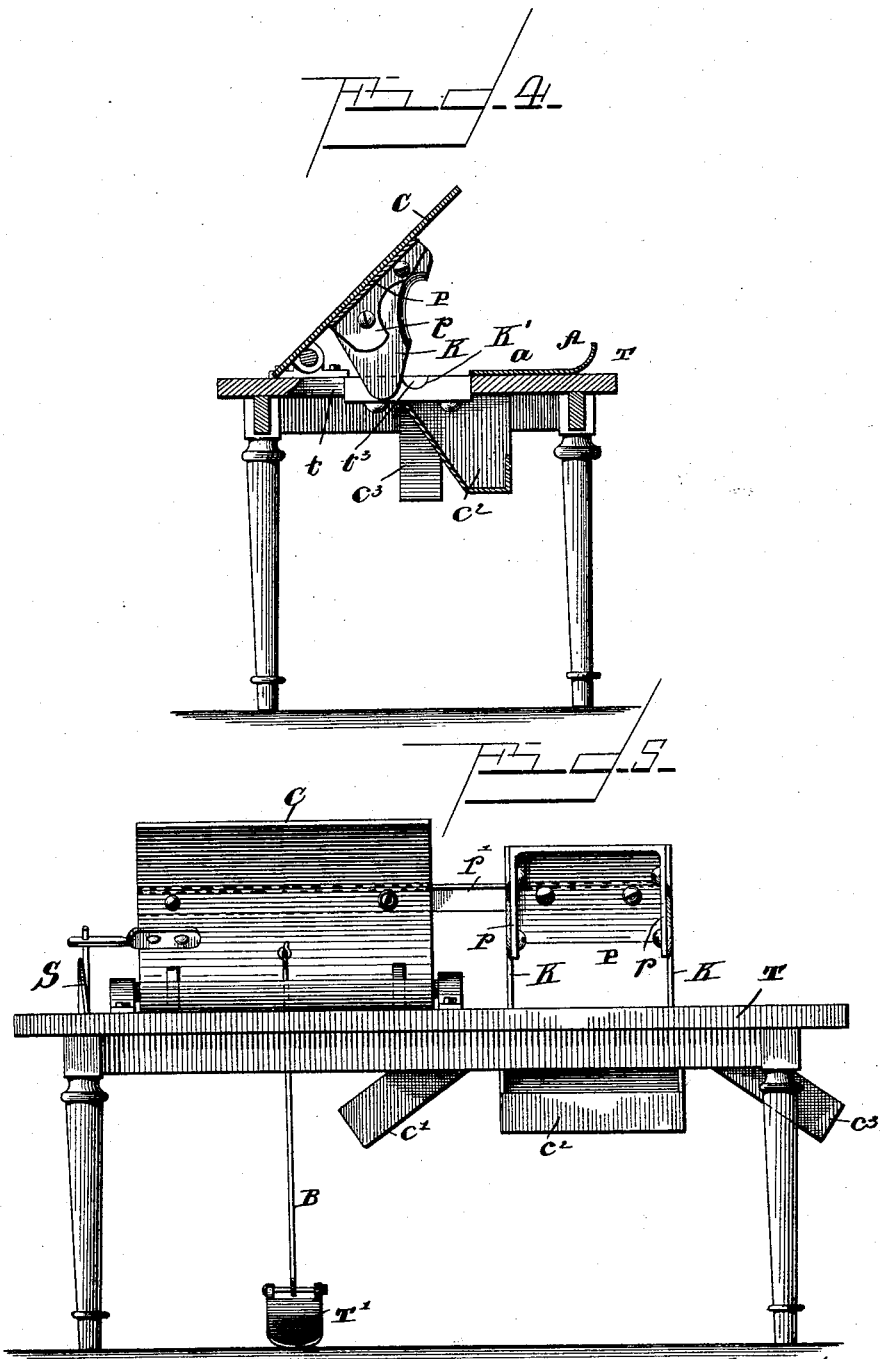

UNITED STATES PATENT OFFICE.

THOMAS STREAT, OF RICHMOND, VIRGINIA, ASSIGNOR TO HIMSELF AND PHILIP WHITLOCK, OF SAME PLACE.

CIGAR-MAKER'S IMPLEMENT.

SPECIFICATION forming part of Letters Patent No. 454,084, dated June 16, 1891.

Application filed March 23, 1891. Serial No. 386,093. (No model.)

*To all whom it may concern:*

Be it known that I, THOMAS STREAT, a citizen of the United States of America, residing at Richmond, in the county of Henrico and State of Virginia, have invented certain new and useful Improvements in Cigar-Makers' Implements; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to cigar-makers' implements and is an improvement on the machine or implement shown and described in Letters Patent of the United States granted to me December 25, 1883, No. 290,811; and it consists, essentially, in the combination, with the clamping-plate of said apparatus, of cutters secured, respectively, to the plate and its support for cutting off or squaring the ends of the cigarettes, cheroots, or cigars, as the case may be, and as will now be fully described, reference being had to the accompanying drawings, in which—

Figure 1 is a front elevation, and Fig. 2 a side elevation, of a cigar-maker's implement embodying my improvements; and Figs. 3 and 4 are central sections thereof, taken at right angles to each other. Fig. 5 is a front elevation of the implement, showing the cutting devices located on one side of the clamping-plate.

In my Letters Patent hereinabove referred to I have fully described the advantages of providing means for holding the wrapper as well as the rolling-apron in the rolling of a cigarette, cheroot, or cigar, and I have fully described the construction and operation of the said means, which will therefore need no further description here than a mere reference to the parts.

In the manufacture of cigarettes, cheroots, or cigars by hand after they are rolled or the wrapper applied one or both ends are cut off or squared, and this has heretofore been done in a special machine or by a special cutter.

My present invention has for its object to combine with the implement cutting devices, by means of which the cigarette, cheroot, or cigar may be squared or cut off at either or at both ends, as may be desired or as may be required, the arrangement of the cutting devices being such that the operator need not hold the cigarette, cheroot, or cigar during the operation of cutting, and so that the cutting will be effected by the depression of the clamping-plate.

The clamping-plate C may be mounted upon any suitable support, as a table T, for instance, as shown, upon which table is glued or cemented or. otherwise secured along the rear edge, a rolling-apron A, which consists, usually, of a strip of paper of a width equal to or slightly greater than the article to be rolled therewith and of sufficient length beyond its attached portion $a$ to permit of the rolling of the wrapper around the filler.

The clamping-plate C is depressed by means of a treadle T', connected to a lug L on the under side of said plate by means of a cord or rod B, passing through a suitable slot in the table T. In the construction shown, the lug L is formed on a plate P, that has two flanges $p$ $p$, to each of which is detachably secured a knife K, said knives co-operating with two knives K', detachably secured in slots $t$ in said table, the cutting-edges of both sets of knives being preferably concave. The lower knives K' have their cutting-edges arranged to intersect a transverse slot in the table, whereby three slots or openings $t'$ $t^2$ $t^3$ are formed, the openings $t'$ $t^3$ being comparatively small and serving to receive and discharge the cuttings, while the opening $t^2$ between the knives K' is of the length of a cigarette, cheroot, or cigar, as the case may be. Underneath the table are arranged three discharge-chutes $c'$ $c^2$ $c^3$, those $c'$ $c^3$ receiving the cuttings and discharging the same laterally, while the chute $c^2$ discharges the cigarette, &c., forwardly, a suitable receptacle being provided for each of said chutes.

After the cigarette, cheroot, or cigar is rolled the operator simply pushes or rolls it back into the concave cutting-edge of the knives K', then places a fresh wrapper on the apron A, so that the rear edge of said wrapper will be caught by the front edge of the clamping-plate C, depresses the same to hold the wrapper in position for wrapping a fresh filler, and simultaneously therewith cuts the edges of the previously wrapped cigarette, cheroot, or cigar. In the manufacture of cigars having but one end squared or cut off, one pair of knives is dispensed with, as will be readily understood. As soon as the cigarette is rolled or wrapped the operator releases the plate C, when said plate will be automatically lifted by the spring S. The wrapped cigarette is now pushed onto the knives K', a wrapper and the necessary filler properly placed on the rolling-apron A, the plate C again depressed to cut the previously-made cigarette and clamp the wrapper for the operation of wrapping the next cigarette, and so on.

I do not desire to limit myself to the connection of the cutters to the under side of the clamping-plate, as said cutters may be arranged on one or the other side of said plate and operated thereby, as shown in Fig. 5, in which the movable cutters are secured to a support P, substantially such as described, said plate having an arm p', that is secured to the clamping-plate.

Although I prefer to attach the rear edge of the rolling-apron A to the table, yet this is not absolutely necessary, as the clamp will firmly hold the apron, as well as the wrapper, when depressed.

Having thus described my invention, what I claim is—

1. In a cigar-maker's implement, a stationary support or table, a clamp for clamping the wrapper to the rolling-apron, a stationary cutter, a co-operating movable cutter controlled by the clamp, and means for imparting motion to the clamp to and from its support, for the purpose set forth.

2. In a cigar-maker's implement, a stationary support or table, a clamp for clamping the wrapper to the rolling-apron, a stationary cutter secured to the table, and a cutter secured to the under side of the clamp and adapted to co-operate with the stationary cutter, and means for imparting motion to the clamp to and from the table, for the purpose set forth.

3. In a cigar-maker's implement, a stationary support or table provided with a longitudinal slot, stationary knives arranged between the ends of said slot to form three apertures, a clamp for clamping the wrapper to the rolling-apron, and two cutters secured to the under side of the clamp and adapted to co-operate with the stationary cutters, and means for imparting motion to the clamp to and from the table, for the purpose set forth.

4. In a cigar-maker's implement, a stationary support or table provided with a longitudinal slot, stationary knives arranged between the ends of said slot to form three apertures, that between the knives being the longest, and a rolling-apron having its rear edge secured to the table in front of said slot, in combination with a clamping-plate pivoted on the table and adapted to have bearing on the rolling-apron, two knives secured to the under side of said plate and adapted to co-operate with the stationary knives, a spring operating to normally hold the clamping-edge of the plate off the table, a treadle, and a connection between said treadle and plate to move the latter against the stress of said spring, for the purpose set forth.

5. The combination, substantially as described, with a support or table provided with a longitudinal slot, and the two knives K', arranged with their cutting-edges intermediate of the ends of said slot, of the spring-actuated clamping-plate C, the knife-support P, secured to said plate, and the knives K, secured thereto, a treadle, and a connection between the treadle and clamping-plate, said parts being arranged for operation as set forth.

6. In a cigar-maker's implement, a stationary support or table provided with a longitudinal slot, stationary knives arranged between the ends of said slot to form three apertures, a clamp for clamping the wrapper to the rolling-apron, two cutters detachably secured to the under side of the clamp and adapted to co-operate with the stationary cutters, and means for imparting motion to the clamp to and from the table, for the purpose set forth.

7. In a cigar-maker's implement, a stationary support or table provided with a longitudinal slot, stationary knives arranged between the ends of said slot to form three apertures, a discharge-duct for each of said apertures, secured to the under side of the table, a clamp for clamping the wrapper to the rolling-apron, two cutters detachably secured to the under side of the clamp and adapted to co-operate with the stationary cutters, and means for imparting motion to the clamp to and from the table, for the purpose set forth.

8. In a cigar-maker's implement, a stationary support or table provided with a longitudinal slot, stationary knives arranged between the ends of said slot to form three apertures, a discharge-duct for each of said apertures, secured to the under side of the table and arranged to discharge in opposite directions and forwardly of the table, respectively, a clamp for clamping the wrapper to the rolling-apron, two cutters detachably secured to the under side of the clamp and adapted to co-operate with the stationary cutters, and means for imparting motion to the clamp to and from the table, for the purpose set forth.

9. In a cigar-maker's implement, a stationary support or table, a clamp for clamping the wrapper to the rolling-apron, two stationary cutters detachably secured to the table, and two co-operating movable cutters detachably secured to their support and controlled by the clamp, for the purpose set forth.

THOMAS STREAT.

Witnesses:
WM. ELLYSON,
M. J. STRAUS.